Aug. 15, 1939.　　　　F. E. RICE　　　　2,169,393
DIRECT TAPPING FAUCET STRUCTURE
Filed Jan. 17, 1938
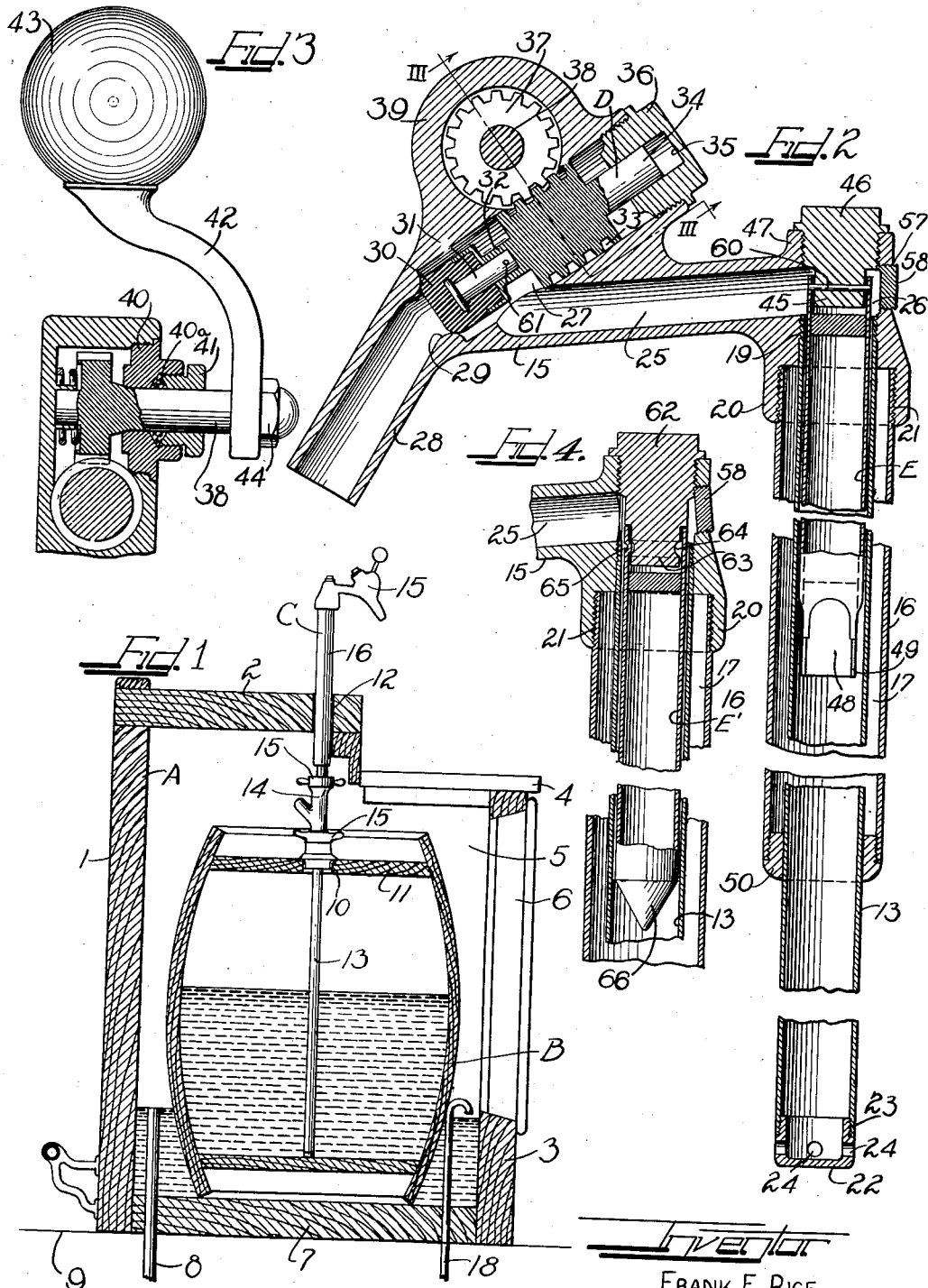
Inventor
FRANK E. RICE Patented Aug. 15, 1939

2,169,393

UNITED STATES PATENT OFFICE

2,169,393

DIRECT TAPPING FAUCET STRUCTURE

Frank E. Rice, Detroit, Mich., assignor to American Tap-Bush Company, Detroit, Mich., a corporation of Delaware Application January 17, 1938, Serial No. 185,257

8 Claims. (Cl. 225—3)

The present invention relates to a direct tapping faucet structure and more particularly to a unit structure including a draught tube and a quick acting faucet, for use in connection with barreled beer for drawing the beer from the barrel.

The present invention relates to a faucet structure which is useful in connection with dispensing systems drawing beer directly from the keg or barrel.

At present the trend in bar design is away from the usual pipe coil arrangement for cooling beer as drawn from the kegs or barrels and dispensed piecemeal into glasses or steins, over a bar, thereby reducing the cost of cooling equipment and tending to more sanitary conditions relating to the draught tube, as a shorter tube is easier to clean than coils of pipe.

In saloons, clubs and the like, maintaining bars for the dispensation of alcoholic beverages, beer is usually dispensed from the barrels or kegs through suitable pipes to the nozzles at the bar, In order to make the beer palatable it is cooled. There are various methods of cooling barreled beer especially where the beer is drawn directly from the keg to the glass without passing through a system of cooling coils. One manner of cooling the beer utilizes the idea of a coil built in the beer barrel through which coil cooling medium is circulated. Another method of cooling is by exposing the beer barrel to a constant spray of chilled water, while another method involves placing the barrel in a tank, cupboard or box, along with ice and water, and drawing off the beer from the barrel.

The present invention is shown in connection with the method of cooling wherein the barrel is placed within a cupboard, box or case built as a part of a bar, and stands in water surrounding the barrel which water is chilled by ice in the cupboard or case. In the form here shown, the cooling water in the cupboard is maintained at a predetermined level by means of an overflow outlet. With this construction, the cupboard, box or case may be made as a part of the bar, the barrels or kegs being placed therein on the bar floor level thus materially reducing the amount of space required for storage of the barreled beer. It is to be understood, of course, that as many barrels may be utilized as the length of the bar permits, and the number of faucets available for use with any particular bar. The manner of cooling the beer in the barrel or container forms no part of the present invention.

The present invention is concerned with a unit draught tube and quick acting faucet structure which may be advantageously employed in an arrangement as described. The faucet and draught tube may be quickly applied to or removed from a barrel, the construction being such that part of the tube passes through an aperture in the top of the bar to make the faucet available for use in position convenient for a bartender. The tube is applied to a barrel with the usual tap and cooperating tap bush. The tap is concealed within the cupboard or portion of the bar enclosing the barrel with the result that there is nothing visible above the top of the bar except a portion of the tube and the faucet as is usual. The combined structure may be chromium plated or otherwise finished to present an attractive and pleasing appearance for such parts as are exposed to view when installed for use.

The pressures within beer barrels or keys vary in accordance with the different practices or ideas of bartenders. Such pressure differentials directly affect the "wildness" of the beer at a given temperature. Variations in the temperature of the beer also affects its "wildness". Beer is dispensed in different places under different pressure conditions, the variations in pressures running from as low as ten pounds to as high as fifty or sixty pounds.

Another important feature of the present invention has to do with the applicability of the structure to meet various pressure conditions present in beer barrels.

A feature of the present invention is directed to means for providing a restricted passageway for the flow of beer from the barrel to the nozzle of the faucet to thereby control or throttle such flow that the beer may be discharged from the nozzle without much foam and at low pressure.

Another feature of the present invention, constituting an object thereof, has to do with the provision of means for restricting flow of beer from a barrel to the faucet nozzle, which means includes a tubular part having a uniform interior diameter through which the beer passes to the faucet, and a member of substantially uniform diameter disposed within said tube part, said member being hingedly supported at one end with its other end free, whereby said member is capable of swinging movement within said tubular part.

An object of the present invention is to provide a combined draught tube and faucet structure including a flow regulating device whereby the rates of flow of the beer may be adjusted independently of the operation of the faucet.

Another object of the present invention is to provide a combined draught tube and quick acting faucet for dispensing beer in order to draw beer directly from a keg or barrel into a glass or stein without passing it through a system of coils.

A further object of the present invention is to provide a draught tube having a portion thereof insulated.

Generally speaking the present invention contemplates a draught tube and faucet structure arranged as a unit device whereby it may be applied to or removed from a beer barrel for withdrawing the beer barrel contents directly therefrom without passing the beer through coils, and which includes a tube which is vertical when in tapping position and in which tube a restrictor is inserted.

The invention also contemplates as an object the provision of a beer dispensing system whereby a barrel of beer may be stored within the confines of a bar and a draught tube connected in communication with the interior of the barrel for directly withdrawing the barrel contents through the draught tube and through faucet structure which is formed as a unit with the draught tube.

The above, other and further objects of the present invention will be apparent from the following description and accompanying drawing:

The accompanying drawing illustrates embodiments of the present invention and the views thereof are as follows:

Figure 1 is a cross-sectional view of a bar constructed in accordance with the present invention showing a barrel confined within a cupboard or casing within the bar with a cooling liquid surrounding the barrel and a unitary draught tube and faucet structure of the present invention inserted through a tap bush in the upper head of the barrel, the draught tube passing through an opening in the top of the bar and downwardly into the barrel.

Figure 2 is an enlarged fragmentary vertical sectional view through the tube and faucet structure of Fig. 1.

Figure 3 is a sectional view taken substantially in the plane indicated by line III—III of Fig. 2 showing the operating knob in place.

Figure 4 is a fragmental vertical sectional view showing a floating plug or restriction rod, as another form of the invention.

The drawing will now be explained:

Referring to Figure 1, a conventional form of bar is indicated at A and includes a front portion 1, a top 2, a back wall 3 and a ledge 4, and a cupboard or case 5 closed normally by a door 6. The bar has a floor portion 7 which makes watertight connection with the front wall 1 and the rear wall 3 and contains a supply of water in which ice may be placed to cool the water. An outlet or overflow pipe 8 is shown as passing upwardly through the bottom 7 terminating above the bottom a predetermined distance to thus maintain the water within the compartment or cupboard at a predetermined level.

The bar is shown as resting on a portion of a floor 9.

Within the compartment or cupboard 5 is a barrel or keg D having a tap bush 10 applied in its upper head 11, as is common practice.

The draught tube and faucet structure of the present invention, designated generally at C, is applied to the barrel by passing it through a suitable aperture 12 in the top of the bar, with the draught tube 13 passed through a tap 14 which in turn is connected to the tap bush to thus hold the draught tube in place. The tap is tightened against the bush by the usual tightening ring.

Surrounding the upper portion of the draught tube, between the tap 14 and the faucet 15 is a casing 16 which is spaced from the draught tube 13 to form a dead air space 17 about the tube and thus insulate this portion of the draught tube.

An inlet pipe 18 is shown as passing upwardly through the bottom 7 of the bar with its upper end arranged to discharge water into the interior of the compartment for cooling the contents of the barrel B. A suitable valve, not shown, is utilized for regulating the amount of water supplied to the interior of the compartment.

Referring particularly to Figure 2, the draught tube 13 is threaded as at 19 to a hub portion 20 of the faucet casting. The jacket 16 is likewise threaded to the hub 20, as at 21, the hub being suitably bored and threaded in the bores as shown. The lower end of the draught tube is closed by a cap member 22 which is threaded as at 23 to the tube, and which cap member is provided with a plurality of lateral apertures 24 whereby beer may enter the tube for discharge through the faucet.

The faucet casting includes a passageway 25 communicating at one end with a chamber 26 formed in the casting and at the other end with a chamber 27. The chamber 27 communicates with the interior of a nozzle 28 for the discharge of beer. The interior of the nozzle is provided with an annular member constituting a seat 29 with which cooperates a valve 30 carried by means of a pin 31 secured in a bore formed in an extension 32 of a spindle D having a central body portion exteriorly threaded as at 33 and an end extremity 34 reciprocable in a bore 35 formed in a cap nut 36 threaded into the outer end of the chamber 27. A gear 37, carried on a shaft 38, meshes with the threads 33 of the spindle to cause axial movement of the spindle to seat or unseat the valve 30. The casting is formed with a housing portion 39 which encloses the gear 37 and the shaft 38 extends through a side of the housing, as may be observed in Figure 3 and through a bearing formed by an insert 40 and a gland 41 compressing a packing 40a between the insert 40 and gland 41, to make a leaktight joint. At the outer end of the shaft 38 a shank 42 is secured which carries a ball 43 at one end serving as a handle for manipulating the valve 30. The shank is secured in position on the stem 38 by means of a nut 44 engaging the threaded extremity of the shaft, not shown. As is common practice the shank 42 is provided with a polygonal hole to interfit with a similarly shaped end extension on the shaft 38.

For controlling or throttling the flow of beer through the draught tube 13 from the barrel to the faucet, a plug E is inserted in the draught tube at the end thereof in communication with the passage 25 through the neck of the faucet.

The plug E is shown as a hollow tube attached at its upper end to the reduced end 45 of a plug 46 which is threaded into a hub portion 47 of the faucet body as illustrated. The tube E is attached to the plug 46 by means of a pin 60, as shown in Figure 2. The lower end of the plug E is closed by a solid insert formed with a part 48 to fit the interior of the lower end of the tube E and an exterior portion which is illustrated as square, and shown in end view in Figure 6, with the corners 49 of the square arranged to lie in contact with the interior of the draught tube 13, as shown in Fig. 6. The cross-sectional area of the square end 48 is less than the cross-sectional area of the draught tube and the outer diameter of the tube E is slightly less than the inner diameter of the draught tube to form an annular passageway between the plug E and the draught tube for beer as it passes upwardly through the draught tube and into the faucet.

The contact of the corners 49 of the end piece or part 48 with the tube 13 centers the plug or restriction rod E and thus maintains the annular passageway for beer between the rod and the tube. The rod E being loosely connected to the cap nut 46 may be said to "float" in the tube 13.

The diameter of the tube or rod E is held to such a dimension as to provide an annular opening or passageway between it and the draught tube as to be of predetermined area. The engagement of the corners 49 of the end portion 48 is to center the tube or plug E in the draught tube and thus afford entrance to the annular passageway between it and the interior of the draught tube. The use of this rod or tube controls the pressure of the beer issuing through the nozzle of the faucet. The diameter of the tube or rod E is made to be proportionate to the pressure present in the keg or barrel.

If the draught tube and faucet structure of the present invention is to be used in a barrel where the pressure ranges from say 18 to 24 pounds per square inch, the outer diameter of the rod or tube E would be a certain amount. If the pressure range is greater, then a tube or rod E would have a slightly larger diameter, thus reducing the volumetric or cross-sectional area of the annular passage between it and the draught tube.

In this form of the invention, the pressure conditions under which the device is to be used must be known. The provision of the jacket 16 about a portion of the draught tube 13 serves to insulate this portion of the draught tube and thus maintain the beer in a draught tube at approximately the same temperature it is when discharged from the barrel and upwardly into the draught tube.

The lower end of the jacket 16 is closed by a threaded ring plug 50 which encircles the draught tube and is threaded into the interior of the jacket, which may be observed in Figure 2.

The presence of the dead air space 17 prevents rapid heat exchange between the beer in the rod 13 and the surrounding atmosphere.

The chamber 26 of the faucet casting is provided with a cleanout opening 57 which is normally closed by a plug 58.

The structure of the present invention as illustrated comprises a combined drought tube and quick acting faucet structure constituting a unitary device which may be applied to and removed from a beer barrel and passed through the top of a bar as illustrated in Figure 1. In the use of such device with a beer barrel, where the barrel is cooled by the means described, provision of the insulating casing maintains the temperature of the beer in the draught tube at substantially the same temperature as the beer within the barrel for a sufficient length of time to prevent the beer from becoming so warm as to be flat when drunk, during the interval that the beer remains in the draught tube between services from the faucet, that is, successive glasses full or steins full.

In utilizing the device for drawing beer from the barrel, the bartender holds a glass, stein or other receptacle under the nozzle 28 of the faucet and then actuates the valve 30 by means of the ball handle 43 to unseat the valve whereupon the pressure present in the barrel will discharge beer through the nozzle 28 and into the receptacle held under it. The beer in its passage from the barrel to the nozzle 28 enters the draught tube 13 at its lower end through the apertures 24 in the end cap 22 and passes upwardly under full pressure until entering the passageway of restricted volumetric capacity or cross-sectional area, which is the passageway between the plug E and the interior of the draught tube 13, whereupon the pressure is reduced so that the beer issues from the nozzle 28 slowly and without the formation of excessive foam in the receptacle.

The provision of the jacket 16 in the form of the invention illustrated in Figure 2 maintains the beer trapped in the draught tube, between successive draughts, at substantially barrel temperature.

Referring to the form of the invention illustrated in Fig. 4, a cap nut 62 loosely supports a plug or restricting rod E' which plug is inserted through the hub portion 47 of the faucet body in lieu of the cap 46 and the rod E. The nut 62 has its inner end lengthened and reduced in diameter, as in 63, with an annular groove 64 formed in its outer surface. The plug or restricting rod E' is hollow and its upper end receives the end 63 of the nut 62. The plug E' is formed with detent 65 which engages the groove 64 to loosely connect the tube to the nut 62 so that the same may be installed and removed as a unitary structure. As in the case of the plug or restricting rod E, the external diameter of the rod E' is slightly less than the internal diameter of the draught tube 13 to cooperate therewith to form an annular passageway for beer. The lower or inner end of the restricting rod E' is pointed, as at 66 with a conical end which end serves to center the rod E' within the draught tube 13 as the beer passes from the barrel to the faucet, and thus maintains the annular passageway between the plug E' and the draught tube 13. The tube, may be said to "float" in the draught tube. Such construction eliminates any necessity for guides between the restricting rod E' and the draught tube 13.

The structure of the present invention is one which may be readily kept in sanitary condition as it is so constructed that the various parts may be readily removed for sterilization.

The spindle D, the valve 30, and associated parts may be removed by unscrewing the cap 36 and rotating the gear 37 in a direction to move the spindle outwardly of the chamber 27 out of mesh with the gear. The plug E may be removed by unscrewing the plug nut 46 from the faucet body casting. The draught tube and jacket may be unscrewed from the hub 20 of the faucet casting, and a cleanout plug 59 removed so that the interior of the passage 25 of the faucet casting may be suitably cleaned.

It will be noted that all of the parts of the structure with which the beer comes in contact are easily accessible and available for cleaning purposes so that there is no likelihood whatsoever of contamination of the beer because of the deposit of foreign matter in the draught tube and faucet structure.

The pin 31 which holds the valve 30 in operative relation with respect to the spindle D may be secured in place by any suitable manner, the form here shown consisting of a pin 61 passed through reduced end 32 of the spindle and a suitable aperture in the pin 31.

As is customary in bar construction, a portion of the bar underlying the faucet 15 is usually formed as a drain board or tray so that drippings may be collected or passed to a waste pipe.

The manner of installing the shaft 38 in the faucet body as described, that is to say, including the use of the gland plug 41, and gland packing 42 withstands higher pressures with which the faucet is designed to be used without any leakage.

The invention has been described herein more or less precisely as to details, yet it is to be understood that the invention is not to be limited thereby, as changes may be made in the arrangement and proportion of parts and equivalents may be substituted without departing from the spirit and scope of the invention.

The invention is claimed as follows:

1. In a beer barrel tapping device for drawing beer directly from a barrel, a tube adapted for communication with the interior of the barrel and maintained in vertical position when in place for tapping purposes, and a member supported within said tube and materially restricting the flow of beer through said tube, said member being suspended by its upper end with its lower end free whereby said member is capable of swinging movement within said tube.

2. In a beer barrel tapping device for drawing beer directly from a barrel, a unitary faucet and tube structure communicating with the interior of the barrel, said tube adapted to be maintained in the barrel in vertical position when in place for tapping purposes, and a member supported within said tube and materially restricting the flow of beer through said tube, said member being suspended by its upper end with its lower end free for swinging within said tube, the lower extremity of said member being pointed for automatically centering said member in the tube by flow of beer through the tube.

3. In a beer barrel tapping device, a tube adapted to be maintained in vertical position when in place for tapping purposes and in communication with the interior of the barrel, and a member supported within said tube against endwise movement and materially restricting the flow of beer through said tube, said member being suspended by its upper end with its lower end free whereby said member is capable of swinging movement within said tube.

4. In a beer barrel tapping device, a draft tube adapted to be inserted and maintained in the barrel in vertical position, said tube having an interior portion of uniform cross-section, a member of uniform cross-section suspended solely from its upper end and disposed within said tube portion of uniform cross-section and materially restricting the flow of beer through said tube, the transverse dimension of the member cross-section being less than the transverse dimension of the cross-section of the tube portion to provide passageway between said tube and said member, said member being positioned solely by its suspended upper end whereby said member is capable of swinging movement within said tube.

5. In a beer barrel tapping device, a draft tube adapted to be inserted in a barrel and maintained in vertical position, a self-centering member within said tube for materially reducing the flow of beer through said tube, said member being swingingly suspended from its upper end and having its lower end pyramidally pointed to constitute means for automatically centering said member by the flow of beer through said tube.

6. In a beer barrel tapping device, a draft tube adapted to be inserted in a barrel and maintained in vertical position, a restrictor suspended within said tube with its lower end free to swing, and means suspending said restrictor within said tube for holding the same against endwise movement while allowing swinging movement of the restrictor.

7. A tap rod for conducting beer from a container comprising a tube adapted to be inserted in the container and having a hollow interior, a plug suspended from its upper end within said tube and capable of swinging movement within the tube, the lower end of said plug being pointed for automatically centering the plug by the flow of beer through said tube.

8. A beer barrel tapping device for drawing beer directly from a barrel comprising a tube adapted for communication with the interior of the barrel and maintained in vertical position when in place for tapping purposes, and a member supported within said tube and materially restricting the flow of beer through said tube, said member being hingedly supported at one end with its other end free whereby said member is capable of swinging movement within said tube.

FRANK E. RICE.